United States Patent [19]

Morss et al.

[11] Patent Number: 5,093,776
[45] Date of Patent: Mar. 3, 1992

[54] INFORMATION PROCESSING SYSTEM EMULATION APPARATUS AND METHOD

[75] Inventors: Stephen Morss, Somerville; Boris Dreyfus, Lexington, both of Mass.

[73] Assignee: Wang Laboratories, Inc., Lowell, Mass.

[21] Appl. No.: 367,297

[22] Filed: Jun. 15, 1989

[51] Int. Cl.$^5$ ............................................. G06F 9/00
[52] U.S. Cl. .................... 395/500; 364/232.3; 364/927.81; 364/DIG. 1
[58] Field of Search ............. 364/927.81, 578, 232.3

[56] References Cited

U.S. PATENT DOCUMENTS

| | | |
|---|---|---|
| 3,938,101 | 2/1976 | Lewis et al. |
| 3,955,180 | 5/1976 | Hirtle ............................ 364/200 |
| 4,031,517 | 6/1977 | Hirtle . |
| 4,313,162 | 1/1982 | Baun et al. |
| 4,315,321 | 2/1982 | Parks, III et al. .............. 364/900 |
| 4,447,876 | 5/1984 | Moore . |
| 4,482,948 | 11/1984 | Holden . |
| 4,484,266 | 11/1984 | Becker et al. |
| 4,509,122 | 4/1985 | Agnew et al. |
| 4,547,849 | 10/1985 | Louie et al. |
| 4,590,556 | 5/1986 | Berger et al. |
| 4,638,423 | 1/1987 | Ballard . |
| 4,665,501 | 5/1987 | Saldin et al. |
| 4,675,813 | 6/1987 | Locke . |
| 4,727,480 | 2/1988 | Albright et al. ................ 364/200 |
| 4,875,186 | 10/1989 | Blume, Jr. |
| 4,920,481 | 4/1990 | Binkley et al. ................. 364/200 |

FOREIGN PATENT DOCUMENTS 0168084 1/1986 European Pat. Off. .
0205949 12/1986 European Pat. Off. .
0260568 7/1987 European Pat. Off. .

*Primary Examiner*—Salvatore Cangialosi
*Attorney, Agent, or Firm*—Michael H. Shanahan

[57] ABSTRACT

For use in an information processing system 10, the system including a system bus 16 having a system address bus 16a and a system data bus 16b and at least two data processors 12 and 14 coupled to the system bus, emulation apparatus for enabling a first one of the data processors to execute, in conjunction with a second one of the data processors, a program requiring access to predetermined address locations associated with a specific type of device, typically an I/O device. The specific type of device is either not resident within the system or is resident at different address locations. The emulation apparatus includes circuitry 30 for detecting an occurrence of an access cycle by the first data processor to the predetermined address location, circuitry 50 for halting the first data processor before completion of the access cycle and circuitry 50 for notifying the second data processor that the first data processor is halted. The emulation apparatus further includes circuitry 24a for indicating to the second data processor a value of the predetermined address location being accessed and a type of access to the predetermined address location. The second data processor includes circuitry for interpreting the address value and type of access, for accessing a corresponding address location having a same type of specific device or a corresponding type of device and for causing the first data processor to be released to complete the access cycle.

24 Claims, 5 Drawing Sheets

1

INFORMATION PROCESSING SYSTEM EMULATION APPARATUS AND METHOD

FIELD OF THE INVENTION

This invention relates generally to information processing systems and, in particular, to an information processing system having an applications processor (AP) and a virtual input/output (I/O) processor (VIOP), the system being responsive to the operation of the AP to suspend operation of the AP when the AP accesses predetermined regions of the system address space.

BACKGROUND OF THE INVENTION

For certain applications it is desirable to provide an information processing system which emulates the functionality of another information processing system. Such a system is especially advantageous when it is desired to execute, with a first type of system, application software developed for a second type of system.

As can be appreciated, in such systems it is desirable that the software be executed with little or no change. That is, if it becomes necessary to rewrite portions of the software the desirability of executing the software on the first type of system is decreased.

One impediment to this type of system emulation is that the software is typically written to interact with a specific type of I/O device. For example, a serial communications program is written for a particular type of serial communication integrated circuit located at a specific system address. One approach to emulation may be to provide the specific types of I/O devices required by the application software. However, in many types of systems this is not desirable or practical in that the system may be primarily used for significantly different applications.

It has been known to provide in such systems a first application processor which executes the desired application software and a second emulation control processor. However, many of these conventional types of systems utilize a mechanism whereby an access by the application processor to a specific I/O device generates an interrupt which in turn invokes specific and different software routines by the application processor. Such interrupt driven systems typically require that portions of the application software be rewritten and/or that additional application software be provided in order to properly emulate the I/O devices. Thus, the portability and ease of use of the target application software is compromised.

SUMMARY OF THE INVENTION

The foregoing problems are overcome and other advantages are realized by an emulation method and apparatus disclosed below. In accordance with a method of the invention there is disclosed for use in a data processing system having at least a first and a second data processor a method of emulating with a second one of the data processors an I/O device accessed by an application program executed by a first one of the data processors. The method includes the steps of (a) detecting a read or a write access cycle made by the first data processor that is directed to a predetermined address location associated with the I/O device, (b) suspending the operation of the first data processor such that the access cycle is not completed and (c) notifying the second data processor that operation of the first data processor is suspended. The method further includes the steps of (d) determining with the second data processor the identity of the I/O device to be emulated, (e) emulating the I/O device by accepting or providing an information unit associated with the read or the write access cycle, respectively, and (f) resuming the operation of the first data processor such that the access cycle is completed.

In accordance with apparatus of the invention there is disclosed for use in an information processing system, the system including a system bus having a system address bus and a system data bus and at least two data processors coupled to the system bus, emulation apparatus for enabling a first one of the data processors to execute, in conjunction with a second one of the data processors, a program requiring access to predetermined address locations associated with a specific type of device, typically an I/O device. The emulation apparatus includes circuitry for detecting an occurrence of an access cycle by the first data processor to the predetermined address location, circuitry for halting the first data processor before completion of the access cycle and circuitry for notifying the second data processor that the first data processor is halted. The emulation apparatus further includes circuitry for indicating to the second data processor a value of the predetermined address location being accessed and a type of access to the predetermined address location. The second data processor includes circuitry for interpreting the address value and type of access, for accessing a corresponding address location having a same type of specific device or a corresponding type of device and for causing the first data processor to be released to complete the access cycle.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF THE INVENTION

Figure 1:
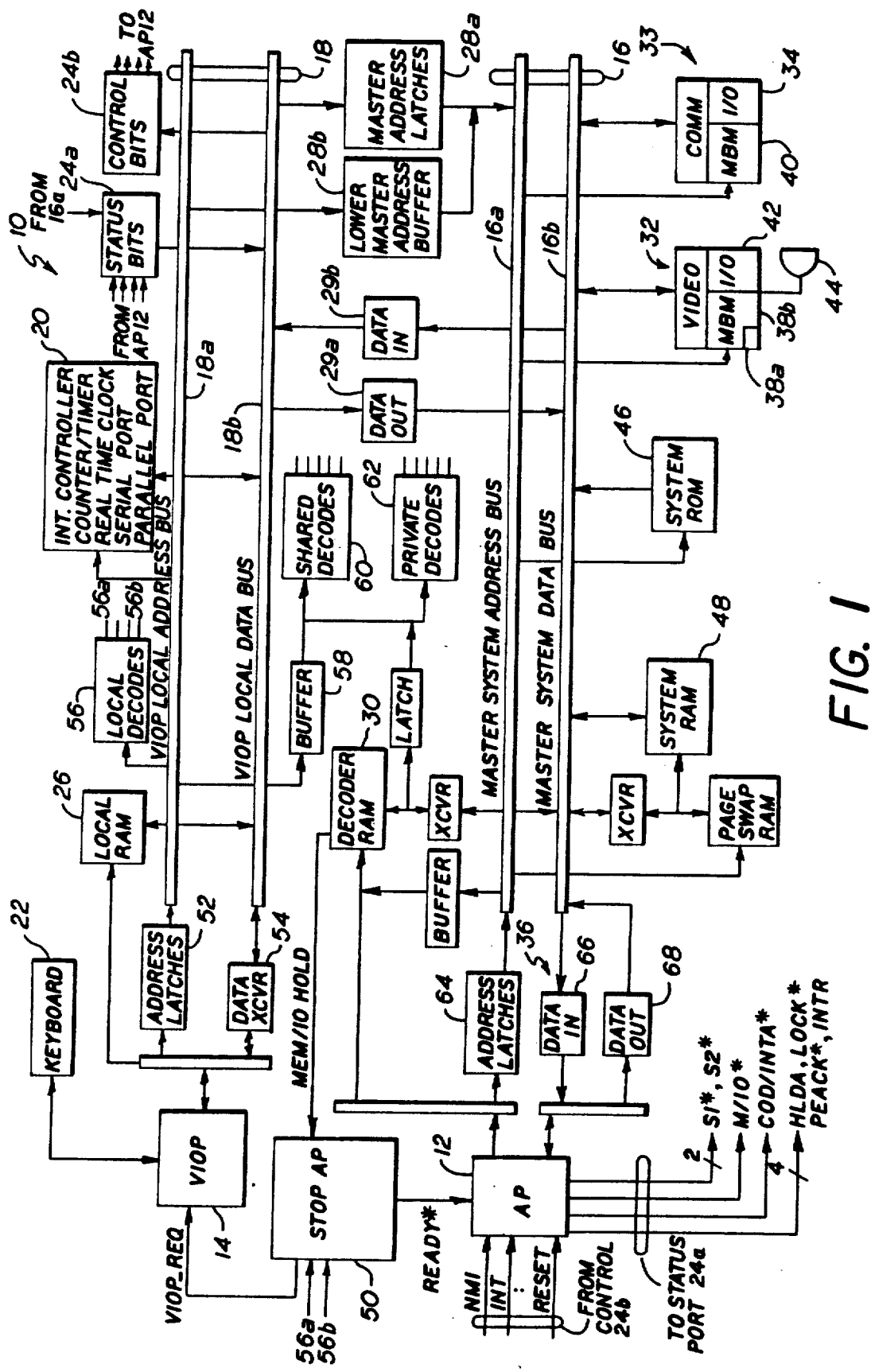
FIG. 1 is a detailed block diagram of an information processing system having an AP and a VIOP which is constructed and operated in accordance with the invention.
Figure 2:
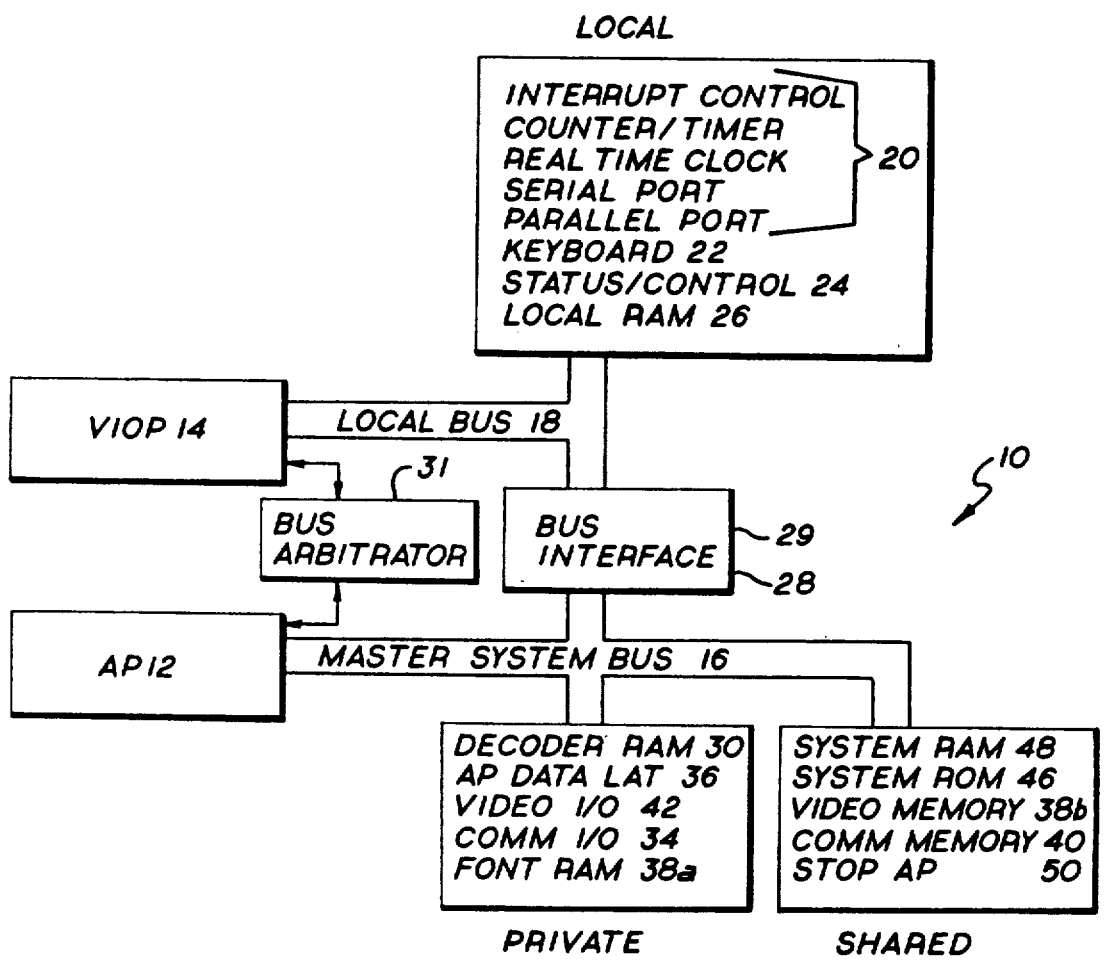
FIG. 2 is a block diagram of the information processing system.

Referring to FIGS. 1 and 2 there is shown a block diagram of an Information Processing System (IPS) 10. IPS 10 includes an AP 12, a VIOP 14, a Master System Bus (MSBus) 16 and a VIOP Local Bus 18. The MSBus 16 includes a Master System Address Bus (MSAB) 16a and a Master System Data Bus (MSDB) 16b. The VIOP Local Bus 18 includes a Local Address Bus (LAB) 18a and a Local Data Bus (LDB) 18b. A number of I/O peripheral devices are provided and are grouped into different categories depending on which of the buses 16 or 18 that a particular peripheral is coupled to.

In a presently preferred embodiment of the invention the AP 12 is an 80286 microprocessor device which is manufactured by the Intel Corporation of Santa Clara, Calif. The functionality of this device is fully described in the 80286 Hardware Reference Manual, published by the Intel Corporation, the disclosure of which is incorporated herein by reference. The VIOP 14 is a High Performance Microcontroller (HPC16040) which is manufactured by the National Semiconductor Corporation of Santa Clara, Calif. As such the ensuing description references specific input/output pins and functions associated with these devices. It is pointed out however that the practice of the invention is not limited to only these types of devices and may be practiced with a number of different types of microprocessors or other processing devices. The ensuing description is therefore not intended to be read in a limiting sense but instead as a presently preferred embodiment of the teaching of the invention.

The AP 12 operates over the MSBus 16. A plurality of System Peripherals are coupled to the MSBus 16 providing the AP 12 with access to certain of these System Peripherals. The VIOP 14, through bus interface circuitry, also has access to the System Peripherals. The System Peripherals include a System Video Peripheral 32 which is comprised of a video controller, a video memory and a Video I/O. The System Peripherals also include a System Communication Peripheral 33 comprised of a Communication Controller, a communication memory and an I/O device. In a presently preferred embodiment of the invention the Communication Controller is comprised of a Z-80 microprocessor device having firmware and other resources to implement a communication port known in the art as a 928 communications interface. Coupled to the 928 interface may be a VS computer system of the type manufactured by Wang Laboratories of Lowell, Mass. As such, and in accordance with one aspect of the invention, the IPS 10 may function as a VS-type 2256C terminal or may function as a WANG IBM Compatible (280) Computer. By example, application software for execution by the AP 12 is downloaded from a host system via the communication port and is stored within the RAM 48. In this regard the VIOP 14 totally emulates disk for the AP 12.

The VIOP 14 operates over the associated VIOP Local Bus 18. A plurality of Local Peripheral Devices (LPDs) 20 are coupled to this bus, the LPDs 20 being accessed only by the VIOP 14. The AP 12 has no direct access to the LPDs 20.

The LPDs 20 include the following devices: an Interrupt Controller, a Counter/Timer, a Real Time Clock, a Serial Communication Port and a Parallel Port. Other local peripherals which are coupled to and accessed only by the VIOP 14 include a Keyboard 22, Status/Control Ports 24a and 24b, a 16K Byte Local RAM 26 and a VIOP 14 Master Address Register 28. The Master Address Register 28 is employed by the VIOP 14 during an access to the MSBus 16 in a manner to be described. The LPDs 20 and the keyboard 22 are peripheral devices of a type typically found in the processing device which is the target of the emulation. For example, an AT-type data processing device includes the same peripheral devices, but not necessarily the same functionally identical peripheral devices. As such, any applications software which is executed by the AP 12 is written to access these peripheral devices at predetermined address locations. In order to emulate the operation of the target processor the VIOP 14 must detect when application software executed by the AP 12 has performed a read or a write access to one of these predetermined locations.

The IPS 10 also includes a plurality of system peripherals which are located on the MSBus 16. Some of these system peripherals are accessed by both the VIOP 14 and the AP 12 while others of these peripherals are accessed only by the VIOP 14. As such, the system peripherals are referred to as Private Peripherals and Shared Peripherals. Private Peripherals are those coupled to the MSBus 16 but which are accessed only by the VIOP 14. Shared Peripherals are those peripherals coupled to the MSBus 16 that are accessed by both the AP 12 and the VIOP 14.

The Private Peripherals include an Address Decoder RAM 30, Video I/O 42, Communications I/O 34, Data Buffers and Latches 36 and a Font RAM 38.

The Video I/O 42 controls the manner in which data for a display screen 44 is generated and managed. In a presently preferred embodiment of the invention the Video I/O 42 is implemented by a LSI device known as a Paradise PVC4A Video Controller which is manufactured by the Western Digital Corporation. A complete description of the functionality of the Video I/O 42 is found in the Paradise PVC4A Specification, published by the Western Digital Corporation.

The Font RAM 38a stores up to two sets of alphanumeric character fonts. The fonts are permanently stored in a System ROM 46 from where they are transferred to the Font Ram 38a by the VIOP 14 during system initialization.

In regard to system initialization upon the generation of a reset signal the AP 12 is maintained in a reset condition while the VIOP 14 is released and begins execution of code from ROM 46. After performing an initial self-test the VIOP 14 locates further executable code in ROM 46 and transfers same to local RAM 26 from which the VIOP 14 initializes the system and eventually accesses a predetermined location to release the AP 12 from the reset condition.

The above mentioned Shared System Peripherals include a System RAM 48 and the System ROM 46 which, in addition to storing the fonts, also stores the system diagnostic and initialization code. The Shared Peripherals also include a 64K Video Memory 38b and a Communications buffer memory 40.

In accordance with the invention the Shared Peripherals also include Stop AP circuitry 50 that generates a signal to halt the operation of the AP 12 when the AP 12 attempts to access a predetermined area or areas of the system memory. The predetermined areas of memory are programmed into the Decoder RAM 30 by the VIOP 14 during system initialization, the Decode RAM 30 having address inputs coupled to the system address bus 16a. Any AP 12 initiated Master System Bus 16 cycle which generates the MEM/IO Hold signal causes STOP AP 50 to generate a Not Ready (READY*) signal that is applied to a Ready input terminal of the AP 12. Alternatively, the STOP AP signal may be generated directly by the VIOP 14 accessing a predetermined I/O location, thereby generating a signal 56a. For this latter case the operation of the AP 12 is halted by the imposition of wait states beginning at the next AP 12 bus cycle. If the STOP AP select signal is instead generated by the AP 12 during an AP 12 access the AP 12 is halted and immediately begins the execution of wait states within the current bus cycle. Thus, if the AP 12 attempts to access a predetermined portion of memory, such as an I/O device, the Decoder RAM 30 detects same and initiates the assertion of the AP 12 Not Ready signal line, thereby causing the AP 12 to suspend the I/O access and execute Wait states. At substantially the same time the VIOP 14 is notified that the AP 12 is suspended via an interrupt input or by polling a VIOP_REQ bit that is coupled to the VIOP 14. The VIOP 14 responds by determining, in a manner to be described, the cause of AP 12 processing suspension such as which address location the AP 12 was attempting to access and what type of access was attempted. The VIOP 14 subsequently performs the desired I/O access such as to one of the LPDs 20. When the I/O access is completed, the VIOP 14 generates a signal 56b that causes the STOP AP circuitry to release the AP 12 Not Ready signal line, thereby allowing the AP 12 to resume operation. The AP 12 completes the suspended bus cycle and begins a next bus cycle without knowledge of the intervention of the VIOP 14.

The Decoder RAM 30 is embodied in a static RAM device employed to dynamically allocate regions of the system address map. One function of the Decoder RAM 30 in the IPS 10 is to remap various sections of memory to other areas of memory. By changing values in the Decoder RAM 30, for example, the addresses associated with the Communications Memory 40 can be moved to other locations within the AP 12 address space.

The Decoder RAM 30 operates on memory blocks of a predetermined size and disposed on predetermined boundaries. As implemented, the Decoder RAM 30 reassigns any 4K byte block of memory to any other 4K block. For example, the AP 12 application software may be executing code associated with I/O addresses that results in the reading and writing of the Communications Memory 40, when in actuality the VIOP 14 has programmed the Decoder RAM 30 so that any access of the Communications Memory 40 by the AP 12 causes the AP 12 to instead access System RAM 48 locations chosen by the VIOP 14.

In operation, the Decoder RAM 30 uses the AP 12 address bits 23-12 to produce a four bit value. Three of these four bits, the Master System Select bits (MASYS_SELA2-0) are latched and decoded to access the target peripheral. The fourth bit from the Decoder RAM 30 is used to add a wait state to the peripheral being accessed, if desired. Also, there is a SHAREDSEL signal which is used to enable the proper decoder circuits. The SHAREDSEL signal identifies whether the cycle in progress is to a shared peripheral (SHAREDSEL=1) or a private peripheral (SHAREDSEL=0).

The IPS 10 also includes a number of Bus Interface devices. The VIOP 14 is coupled to the VIOP Local Bus 18 via a 16 bit address latch 52 and a 16 bit data transceiver 54. A Local Bus Decoder 56 decodes a portion of the Local Address Bus 18a to generate a plurality of local device select signals. The Local Address Bus 18a is also buffered by a buffer 58 and applied to a shared decoder 60, which generates select signals for the Shared Peripherals, and to a private decoder 62 which generates select signals for the Private Peripherals. AP 12 Bus Interface devices include a 24 bit address latch 64, a 16 bit data input latch 66 and a 16 bit data output latch 68. The latches 66 and 68 also form a VIOP Data Buffer 36 Private Peripheral device. That is, the AP 12 Data In latch 66 is written by the VIOP 14 while the AP 12 Data Out latch 68 is read by the VIOP 14.

Another function of the Bus Interface circuitry is arbitration between the AP 12, the VIOP 14, and refresh of the system RAM 48. The VIOP 14, via address latches 28 and data latches 29, waits for arbitration in order to gain access to the MS Bus 16. The memory refresh function has the highest Master System Bus 16 priority, followed by the VIOP 14 and the AP 12. Between every consecutive Master System Bus cycle the AP 12 is given an opportunity by arbitration logic 31 to gain control of the MS Bus 16 if it has a pending request. If the MS Bus is not in use, bus control defaults in favor of the AP 12 such that a subsequent AP 12 request is serviced as quickly as possible.

The VIOP 14 writes the Master Address Latch 28a with the value of the upper 16 bits of the Master System Address. Then, using another port value for the target peripheral, the VIOP 14 lower 8 address bits are used to access a 256 byte block via Address Buffer 28b. In other words, for every 16 bit value written into the VIOP 14 Address Register 28a, the VIOP 14 can access via Address Buffer 28b 256 consecutive locations on the Master System Bus 16.

The Status/Control Ports 24a and 24b are used by the VIOP 14 to read status bits or write control bits for various circuitry of the IPS 10. There are a plurality of multi-level 16 bit Status Ports 24a accessible by the VIOP 14. These ports are used by the VIOP 14 to determine several current operating parameters of the IPS 10, including the state of the AP 12 address and other output signal lines.

Functions related to the AP 12 which are controlled by the VIOP 14 using the Control Port 24b bits are as follows:

(a) set/reset the AP 12 NMI, INT, HOLD, BUSY*, ERROR*, and PEREQ pins,
(b) stop the AP 12 on a next AP 12 bus cycle,
(c) enable the VIOP 14 to interrupt the AP 12,
(d) pass AP 12 Address bit 20, and
(e) reset the AP 12.

An important function of the VIOP 14 is to control the IOP 10 hardware in response to actions by the AP 12 in such a manner that the AP 12 application software is unaware of the presence of the VIOP 14 or that any external intervention has occurred. It is therefore necessary that the VIOP 14 be able to determine the state of the AP 12 and also to control the AP 12 by controlling certain ones of the AP 12 input pins.

The VIOP 14 determines the state of the AP 12 microprocessor by reading the Status Port 24a to determine the state of the certain AP 12 output pins. The various combinations of the S1*, S0*, M/IO*, and COD/INTA* output pins together indicate what type of bus cycle the AP 12 is attempting to perform.

The VIOP 14 is also apprized of the current operating state of the AP 12 by several other status signals read from the Status Port 24a. These include the following status signals.

| | |
|---|---|
| WORD_BYTE* | Word_Byte*, when deasserted, indicates that the current AP cycle is a word width (16 bits) operation. Word_Byte* is deasserted when Master_A0 and Master BHE* are both low. |
| AP_SHTDWN* | AP_SHTDWN*, when asserted, indicates that the AP 12 has entered the shutdown mode of operation. Shutdown occurs when a severe error is detected that prevents further AP instruction processing. |
| AP_VIOPXPT | AP_VIOP Exception, when asserted, |

-continued indicates that the operation of the AP 12 has been halted for one of the following reasons:
(a) a system parity error,
(b) a HLDA by the AP,
(c) a forced exception by the VIOP, or
(d) a forced AP hang condition initiated by the VIOP.

In addition to reading the AP 12 status the VIOP 14 controls the states of certain of the AP 12 input pins via the Control Port 24b. These input pins include the following.

| | |
|---|---|
| AP_NMI | When asserted, generates a non-maskable interrupt (NMI) to the AP 12. |
| AP_INT | When asserted, generates an Interrupt Request to the AP 12 that requests the AP 12 to suspend current program execution and service a pending external request. |
| AP_HOLD | When asserted, permits another local bus master to request control the local bus. |
| AP_BUSY* | When asserted, indicates to the AP 12 that a processor extension is busy such that the AP 12 suspends program execution and waits until BUSY* becomes inactive. |
| AP_ERROR* | When asserted, causes the AP 12 to perform a processor extension interrupt when executing WAIT or some ESC instructions. |
| AP_PEREQ | When asserted, requests the AP 12 to perform a data operand transfer for a processor extension. |
| RESET_AP* | When asserted, causes a reset pulse to be sent to the AP 12. |

The current state of the Master System Address Bus 16a is also read by the VIOP 14 through the Status Port 24a. The information accessed from the Master System Address Bus 16a depends upon when it is read. During normal operation, the Master System Address Bus 16a holds the current value of AP 12 Address Bus bits 0–23.

The basic technique for the VIOP 14 to read the status of the AP 12 is a three part process. First the VIOP 14 waits for the AP 12 to require assistance. This first step is accomplished by the VIOP 14 polling a single bit, specifically the VIOP_REQ bit that is coupled directly to an input pin of the VIOP 14. When the bit is asserted the VIOP 14 reads from Status Port 24a six status bits including the four AP status bits S1, S0, M/IO* and COD/INTA* and also the Word_Byte* and the A_VIOPXPT bits. These bits inform the VIOP 14 of whether the AP 12 needs assistance in completing a current bus cycle (memory cycle, IO cycle, interrupt acknowledge cycle, bus error), or whether something exceptional has occurred. The AP_VIOPXPT bit is asserted whenever there is a system parity error, the AP 12 has relinquished its associated bus, or the VIOP 14 has directly placed the AP 12 into wait states by asserting the STOP AP control bit that causes the AP 12 READY* signal to be deasserted. If the Exception bit is high, the exception condition is always handled first. Once the main status register is read, the VIOP 14 reads bits in other status registers to properly specify the condition.

In order to optimize system performance, for some cases the VIOP 14 status reads are modified from a three part to a two part process. That is, instead of requiring the VIOP 14 to read the six AP 12 status bits to determine a general AP status, and then read other status bits to determine a specific status condition the invention combines these functions in hardware such that the VIOP 14 determines the general status as well as the specific status in one status read. One reason why this technique is not employed for all status reads relates to the memory capacity of the specific embodiment of the VIOP 14 and to the relatively large number of bits required to communicate the general and specific AP 12 status bits. Jump tables are employed in the VIOP 14 memory to process the status bits, where the status bits are used as an offset into the jump tables.

A balance between VIOP 14 memory capacity and optimum system response and performance is achieved by enabling the most common request type, the I/O request, to be handled by the VIOP 14 as a two part process. Instead of reading the six general status bits and deciphering their content, as previously described, the VIOP 14 reads instead a different set of Status Port 24a status bits. One of these bits indicates to the VIOP 14 whether there is a pending AP 12 I/O request. If there is a pending AP 12 I/O request, the other status bits reflect the state of the AP 12 address lines. That is, the address bits indicate the identity of the I/O location accessed by the AP 12 and thus the type of I/O device that the VIOP 14 is to emulate. Other, non-I/O, AP 12 requests are processed by reading the six general status bits as previously described.

Figure 3:
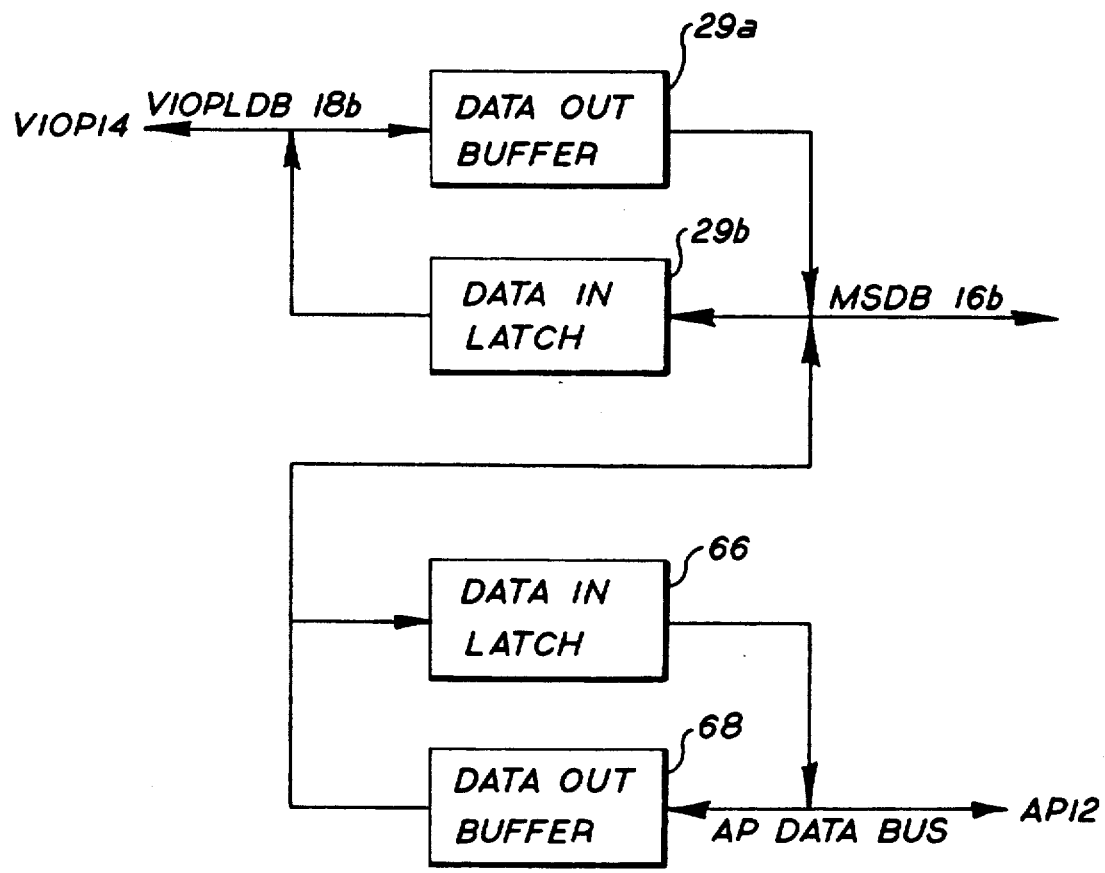
FIG. 3 is a block diagram which shows the arrangement of VIOP and AP data buffers and latches.

FIGS. 2 and 3 show the interface between the VIOP 14 and AP 12 data buses. Because both processors are 16 bit devices, there is a one to one correspondence between each bit of the data buses 16b and 18b. It can be seen that each processor is capable of accessing the Master System Data Bus 16b. Additionally, the VIOP 14 is enabled to read data that the AP 12 is attempting to write, as well as to write data for the AP 12 to read.

When the VIOP 14 writes data, the Master System Data Bus 16b is driven by Data Out buffer 29a after the VIOP 14 is granted access to the Master System Bus 16. When the VIOP 14 is reading the Master System Data Bus 16b, the value being read is latched into Data In latch 29b. This happens in two instances. The first is when the VIOP 14 is reading data from a System Peripheral. The second instance is when the VIOP 14 is reading the current AP 12 data on the Master System Data Bus 16b.

Referring to FIG. 3 it can be seen that, when the AP 12 is reading data, the data is latched by Data In latch 66. Data can be loaded into this latch by two methods. The first method involves the AP 12 reading data from a System Peripheral without intervention from the VIOP 14. The second method involves the VIOP 14 writing data to the latch 66 for the AP 12 to read.

When the AP 12 writes data, the data is buffered by DATA Out buffer 68. This buffer is enabled by two methods. A first method is when the AP 12 writes data to a System Peripheral, without intervention from the VIOP 14. A second method is when the VIOP 14 reads the Master System Data Bus. The value the VIOP 14 reads is the value of the AP 12 Data Bus.

The Data Bus Interface 36 between the VIOP 14 and the AP 12 is one of the VIOP 14 Private Peripherals. There are several VIOP 14 addresses that allow the VIOP 14 to read/write the Master System Data Bus 16b, and simultaneously clear conditions that temporarily halt, or hang, the AP 12. In accordance with the emulation system and method of the invention halting the AP 12 is accomplished by inserting wait states into the AP 12 bus operation in progress.

Addresses read by the VIOP 14 include three which generate signals to (a) clear the MEM/IO Hold signal and read the AP 12 write data latch 68, (b) clear the STOP AP signal and read the AP 12 write data latch 68 and (c) clear the master parity error signal and read the AP 12 write data latch 68.

Addresses written by the VIOP 14 include three which generate signals to (a) clear the MEM/IO Hold signal and write the AP 12 read data latch 66, (b) clear the STOP AP signal and write the AP 12 read data latch 66 and (c) clear the master parity error signal and write the AP 12 read data latch 66.

Figure 4A:
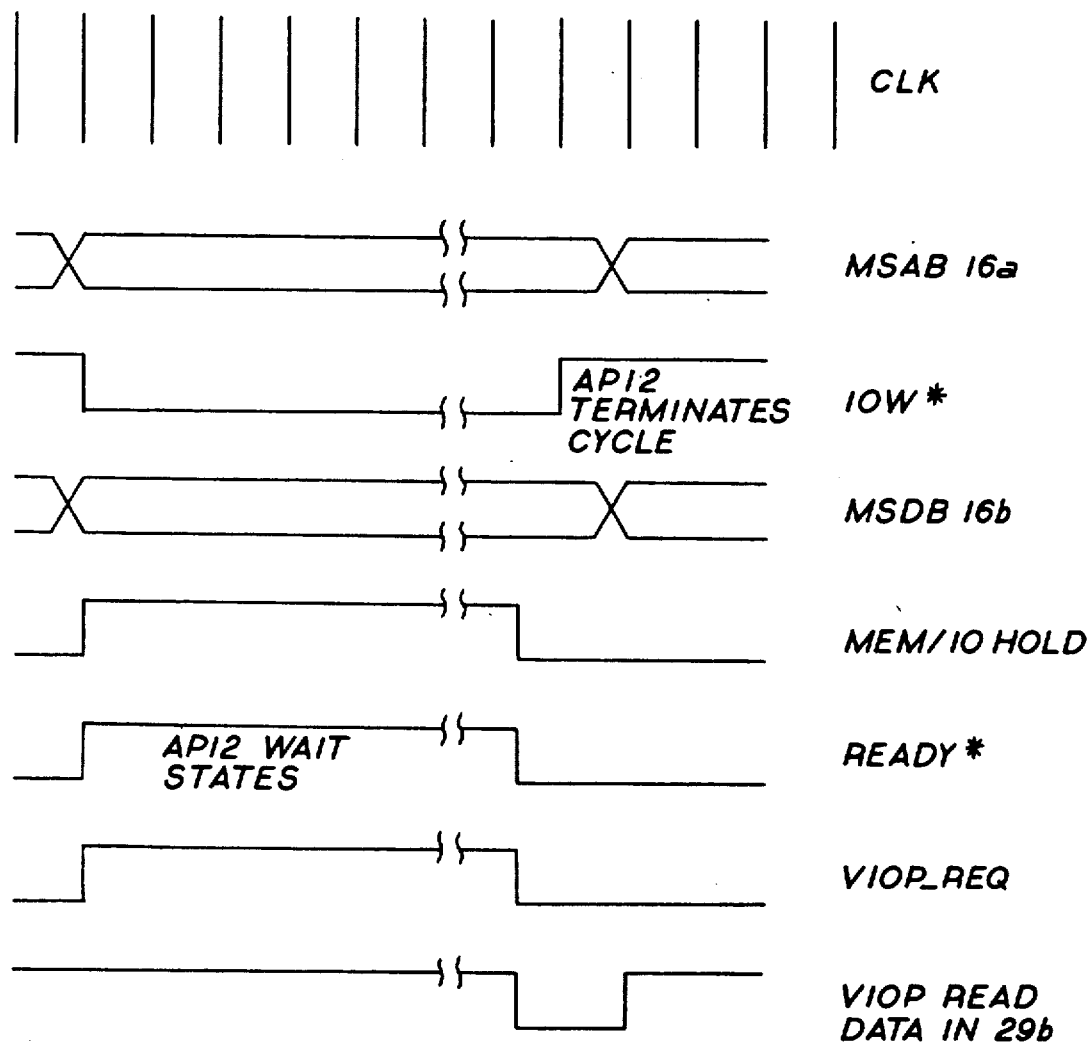
FIGS. 4a and 4b are timing diagrams that illustrate an AP write cycle and an AP read cycle, respectively, the diagrams showing the intervention by the VIOP.
Figure 4B:
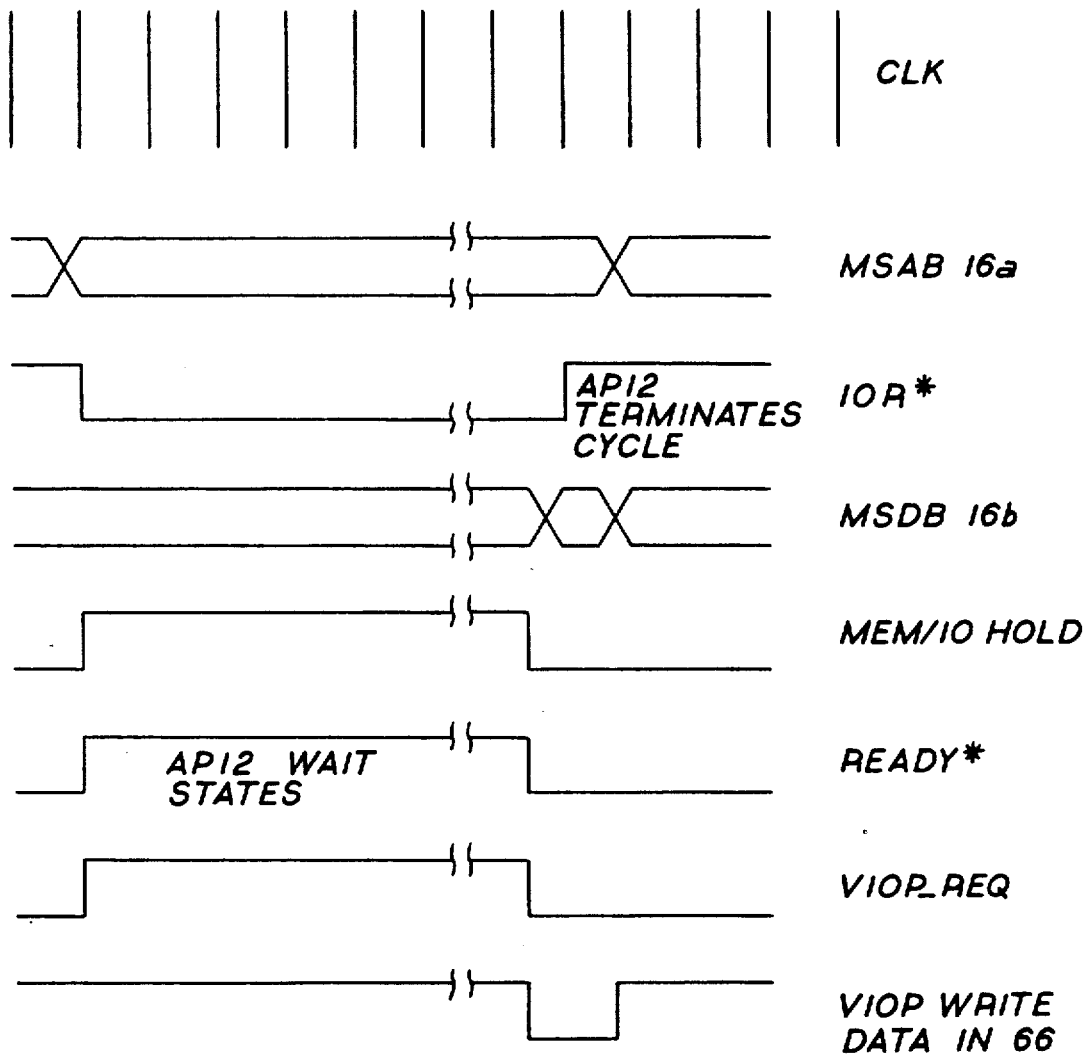

When the AP 12 attempts an operation that it cannot complete unassisted the VIOP 14 must intervene to ensure that the AP 12 can continue. FIGS. 4a and 4b show that operations which the AP 12 initiates but cannot complete cause the AP 12 to hand and execute wait states until the VIOP 14 can determine why the AP 12 is hung and what the proper response should be. One of the steps the VIOP 14 performs is to rad the various status bits from Status Port 24a to determine why the AP 12 is hung. By example and as previously described, if the AP 12 was attempting an I/O access this condition will be indicated by a single bit with other status bits reflecting the identity of the AP 12 accessed I/O address. The VIOP 14 may also determine from Status Port 24a whether a particular memory access is a memory or I/O type cycle and whether the memory access is a read or a write cycle.

Based upon this information the VIOP 14 either reads data from or writes data to the Master System Data Bus 16b and the AP 12 Data Interface circuitry 36. Simultaneous with or separately from reading/writing data, the VIOP 14 clears the condition that caused the AP 12 to hang. Clearing the hang condition allows the AP 12 to continue operation.

It should also be noted that when the VIOP 14 reads one of the previously described predetermined I/O locations the data on the Master System Data Bus 16b is latched into the VIOP's Read Latches 29b. If the AP 12 is writing data that the VIOP 14 must read, the action of reading the data by the VIOP 14 latches the data into the VIOP 14 Read Latches 29b and releases the hold condition on the AP 12, allowing it to continue operation.

Similarly, if the AP 12 is attempting to read data that the VIOP 14 must provide, the VIOP 14 writes one of the previously described predetermined I/O locations thereby latching the VIOP's data into the AP 12 Read Data latch 66 and clears the corresponding hang condition. The AP 12 thereafter accepts this data as though the data was sourced from the actual device it attempted to access.

For example, if the AP 12 attempts to write data to the Counter/Timer device, it causes the Decoder RAM 30 to generate the MEM/IO HOLD signal because the Counter/Timer device is defined as a VIOP 14 Local Peripheral. That is, the Counter/Timer device is not directly available to the AP 12. The VIOP 14 is notified of the AP 12 hang condition by the VIOP_REQ signal either generating an interrupt or by directly polling the state of this signal line. In either case, the VIOP 14 responds to the AP 12 hang condition by determining, via Status Port 24a, from the Master System Address Bus 16a which location the AP 12 was attempting to access, what type of access was attempted and, in that a write access was attempted, determines from the Master System Data Bus 16b via Data In latch 29b what data the AP 12 was attempting to write. This latter operation is accomplished by the VIOP 14 reading the predetermined I/O location, thereby latching the AP 12 data from the Master System Data Bus 16b into the Data In latch 29b. Reading the predetermined I/O location and latching the data into the latch 29b simultaneously generates the AP 12 READY signal, permitting the AP 12 to terminate the present instruction cycle and initiate a next instruction. The VIOP 14 subsequently writes the data read from latch 29b to the appropriate register within the actual LOP 20 Counter/Timer device.

The AP 12 read cycle illustrated in FIG. 4b is similar to that described above except that the VIOP 14 writes the required data into the Data In latch 66, thereby releasing the AP 12 to accept the data and continue operation.

For either of these cases the AP 12 application software is unaware of the existence of the VIOP 14. The imposition of WAIT states is invisible to the AP 12 processor and thus has no impact on the logical flow of the application software. By example, the VIOP 14 provides a total emulation of disk for the AP 12 and loads data to and stores data from the RAM 48. As such, the emulation apparatus and method of the invention permits the execution of application software without modification even though the hardware embodiment of the processing system may be substantially different than that for which the application software was initially written.

While the invention has been particularly shown and described with respect to a preferred embodiment thereof, it will be understood by those skilled in the art that changes in form and details may be made therein without departing from the scope and spirit of the invention.

What is claimed is:

1. In an information processing system including a system bus having a system address bus and a system data bus and at least two data processing means coupled to said system bus, emulation apparatus for enabling a first one of said data processing means to execute, in conjunction with a second one of said data processing means, a program requiring access to predetermined address locations associated with a specific type of function, comprising:

means, coupled to the system address bus, for detecting an occurrence of an access cycle by said first data processing means to the predetermined address location;

means, coupled to said first data processing device and to said detecting means, for halting the first data processing means before the access cycle is completed;

means, coupled to said halting means and to said second data processing means, for notifying said second data processing means that said first data processing means is halted; and means, coupled to said first data processing means, said system, bus and to said second data processing means, for indicating to said second data processing means a value of the predetermined address location being accessed and a type of access to the predetermined address location, said second data processing means including means for interpreting the address value and type of access, means, responsive to the interpreted address value and the type of access, for accomplishing a corresponding function, and means for causing said halting means to release said first data processing means to complete the access cycle.

2. A system as set forth in claim 1 wherein said detecting means comprises a memory device having storage locations associated with regions of the system address space which correspond at least to the predetermined address locations, said memory device having address inputs coupled to the system address bus for identifying addresses thereon which correspond to the predetermined address locations.

3. A system as set forth in claim 1 wherein said halting means has an output signal coupled to an input terminal of said first data processing means, the output signal, when asserted by said halting means, causing said first data processing means to suspend the execution of a current instruction and to execute wait processing states.

4. A system as set forth in claim 1 wherein said notifying means has an output signal coupled to an input terminal of said second processing means.

5. A system as set forth in claim 1 wherein said notifying means has an output signal coupled to an input terminal of said second processing means, said second processing means periodically polling the state of the output signal to determined if the first processing means is halted.

6. A system as set forth in claim 1 wherein said indicating means comprises a plurality of status bits for indicating a state of the system address bus driven by said first data processing means and a state of a plurality of firs data processing means output terminals, including terminals for indicating if the access is a read access or a write access.

7. A system as set forth in claim 6 wherein said system further comprises first storage means, having an input coupled to the system data bus, for storing a data unit being written by said first data processing means to one of the predetermined address locations, said first storage means having an output coupled to said second data processing means for providing the data unit thereto.

8. A system as set forth in claim 7 wherein said system further comprises second storage means, having an input coupled to the second data processing means, for storing a data unit written therein by said second data processing means in response to a read access by said first data processing means to one of the predetermined address locations, said second storage means having an output coupled to said first data processing means for providing the data unit thereto.

9. A data processing system comprising an applications processor for executing an application program which accesses I/O devices at predetermined address locations and a virtual I/O processor for emulating an operation of the I/O devices, the data processing system comprising a system address bus, a system data bus, a local address bus, and a local data bus, the system address bus and system data bus being accessible by either the applications processor or the virtual I/O processor, the local address bus and local data bus being accessible by only the virtual I/O processor, the system further comprising:

address detecting means including a memory device having storage location outputs associated with application program predetermined address locations, the memory device having address input terminals coupled to the system address bus for identifying addresses thereon which correspond to the predetermined address locations;

application processor instruction suspension means having an output signal coupled to an input terminal of the application processor and an input signal coupled to the address detecting means, the instruction suspension means asserting a signal for causing the application processor to suspend the execution of an instruction and to execute wait processing states in response to the application program causing the application processor to generate an address corresponding to one of the predetermined address locations;

means coupled to the virtual I/O processor for notifying the virtual I/O processor that the applications processor has suspended the execution of an instruction and is executing wait processing states; and means associated with the virtual I/O processor for executing instructions to emulate a function of the I/O device associated with the generated address.

10. A system as set forth in claim 9 and further comprising status means having inputs coupled to the system address bus and to application processor processing status signals and having outputs coupled to the virtual I/O processor such that the virtual I/O processor is enabled to determine what type of I/O device to emulate.

11. A system as set forth in claim 10 wherein for a read type of I/O access by the application processor the virtual I/O processor stores a corresponding information unit into a first latch means having inputs coupled to the system data bus, the first latch means having outputs coupled to data input terminals of the application processor.

12. A system as set forth in claim 11 wherein for a write type of I/O access by the application processor the virtual I/O processor reads an information unit written by the application processor, the information unit being stored within a second latch means having inputs coupled to the system data bus, the second latch means having outputs coupled to data input terminals of the application processor.

13. A system as set forth in claim 12 and further comprising means responsive to the virtual I/O processor storing an information unit within the first latch means or reading an information unit from the second latch means for causing the instruction suspension means to deassert the signal thereby enabling the application processor to terminate the execution of wait processing states and complete a suspended instruction.

14. In a data processing system having at least a first and a second data processing means, a method of emulating with a second one of the data processing means an I/O device accessed by a program executed by a first one of the data processing means, comprising the steps of:

detecting an execution of an instruction that initiates a read or a write access by the first data processing means, the read or write access being directed to a predetermined address location associated with the I/O device;

suspending the operation of the first data processing means such that the execution of the instruction is not completed;

notifying the second data processing means that the first data processing means has suspended the execution of the instruction;

determining with the second data processing means the identity of the I/O device to be emulated;

emulating the I/O device by accepting or providing an information unit associated with the read or the write access cycle, respectively; and resuming the operation of the first data processing means such that the execution of the instruction is completed.

15. A method as set forth in claim 14 wherein the step of detecting includes a step of decoding an address from an address bus driven by the first data processing means.

16. A method as set forth in claim 14 wherein the step of suspending includes a step of deasserting a ready signal input to the first data processing means.

17. A method as set forth in claim 14 wherein the step of suspending includes a step of initiating the execution of wait processing states by the first data processing means.

18. A method as set forth in claim 14 wherein the step of notifying includes a step of invoking interrupt processing by the second data processing means.

19. A method as set forth in claim 14 wherein the step of determining includes a step of reading the state of an address bus driven by the first data processing means.

20. In a data processing system including a first data processor and a system bus coupled to the first data processor, the system bus including address signal lines for conveying addresses generated by the first data processor during the execution of instructions, emulation apparatus for emulating an operation of one or more devices each of which has an associated address within a range of addresses generated by the first data processor, the emulation apparatus comprising:

means responsive to the generation of a device address by the first data processor for asserting a signal line that is coupled to the first data processor, the assertion of the signal line causing the first data processor to suspend an execution of an instruction that generated the device address;

means, coupled to the address signal lines, for reading therefrom the device address generated by the first data processor;

means, responsive to the device address read from the address signal lines, for identifying and emulating an operation of the device; and means, responsive to the emulating means completing the emulation of the device, for deasserting the signal line, the deassertion of the signal line causing the first data processor to resume the execution of the instruction.

21. Emulation apparatus as set forth in claim 20 wherein the identifying and emulating means is comprised of a second data processor.

22. Emulation apparatus as set forth in claim 20 wherein the system bus includes at least one instruction status signal line for indicating whether the instruction is a data read or a data store type of instruction, wherein the reading means is also coupled to the instruction status signal line for reading same, and wherein the identifying and emulating apparatus, for a data read type of instruction, includes means for providing a data unit to the first processor for being read thereby.

23. Emulation apparatus as set forth in claim 20 wherein the system bus includes at least one instruction status signal line for indicating whether the instruction is a data read or a data store type of instruction, wherein the reading means is also coupled to the instruction status signal line for reading same, and wherein the identifying and emulating apparatus, for a data store-type instruction, includes means for receiving a data unit from the first processor.

24. Emulation apparatus as set forth in claim 21 wherein the device is a first type of data input/output device, wherein the data processing system is further comprised of a second type of data input/output device, and wherein the second data processor is coupled to the second type of input/output device for controlling the operation thereof in response to the first data processor generating addresses that correspond to the first type of input/output device.

* * * * *